United States Patent
Damkat (10) Patent No.: US 9,031,346 B2
(45) Date of Patent: May 12, 2015

(54) METHOD FOR CONVERTING INPUT IMAGE DATA INTO OUTPUT IMAGE DATA, IMAGE CONVERSION UNIT FOR CONVERTING INPUT IMAGE DATA INTO OUTPUT IMAGE DATA, IMAGE PROCESSING APPARATUS, DISPLAY DEVICE

(75) Inventor: Chris Damkat, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 30 days.

(21) Appl. No.: 13/978,351

(22) PCT Filed: Jan. 2, 2012

(86) PCT No.: PCT/IB2012/050011
§ 371 (c)(1),
(2), (4) Date: Sep. 5, 2013

(87) PCT Pub. No.: WO2012/093348
PCT Pub. Date: Jul. 12, 2012

(65) Prior Publication Data
US 2013/0343670 A1   Dec. 26, 2013

(30) Foreign Application Priority Data
Jan. 7, 2011  (EP) ...................... 11150384

(51) Int. Cl.
*G06K 9/40* (2006.01)
*H04N 7/12* (2006.01)
*G06T 5/00* (2006.01)
*H04N 5/208* (2006.01)
*H04N 5/57* (2006.01)
*H04N 21/431* (2011.01)

(52) U.S. Cl.
CPC ............... *G06T 5/001* (2013.01); *H04N 5/208* (2013.01); *H04N 5/57* (2013.01); *H04N 21/4318* (2013.01)

(58) Field of Classification Search
None
See application file for complete search history.

(56) References Cited

U.S. PATENT DOCUMENTS

| | | | | |
|---|---|---|---|---|
| 6,735,330 B1 * | 5/2004 | Van Metter et al. | ........... | 382/132 |
| 6,873,657 B2 * | 3/2005 | Yang et al. | ............... | 375/240.16 |
| 6,965,416 B2 * | 11/2005 | Tsuchiya et al. | ............. | 348/606 |
| 7,130,483 B2 * | 10/2006 | Kim | ................ | 382/266 |
| 7,433,536 B2 * | 10/2008 | Kim | ................ | 382/266 |
| 8,311,357 B2 * | 11/2012 | Yamashita et al. | ............ | 382/254 |
| 2002/0067862 A1 * | 6/2002 | Kim | ................ | 382/266 |
| 2003/0123549 A1 * | 7/2003 | Yang et al. | ............... | 375/240.16 |
| 2007/0171310 A1 * | 7/2007 | Arici et al. | .................... | 348/687 |

* cited by examiner

*Primary Examiner* — Andrae S Allison
(74) *Attorney, Agent, or Firm* — Shimokaji IP (57) ABSTRACT

In a method and device for improving image rendition by contrast and/or sharpness enhancement the sharpness enhancement is made dependent on the local average luminance value. A mix is made of spatially enhanced image signals is used, wherein for various signal differing spatial frequencies are boosted. The mixing factors for mixing of the boosted signals are dependent on a local average luminance value such that the distribution over frequency bands shifts to higher frequencies and sharper enhancement as the luminance value increases.

10 Claims, 5 Drawing Sheets

METHOD FOR CONVERTING INPUT IMAGE DATA INTO OUTPUT IMAGE DATA, IMAGE CONVERSION UNIT FOR CONVERTING INPUT IMAGE DATA INTO OUTPUT IMAGE DATA, IMAGE PROCESSING APPARATUS, DISPLAY DEVICE

FIELD OF THE INVENTION

The invention relates to a method for converting input image data into output image data.

The invention further relates to an image conversion unit for converting input image data into output image data.

The invention further relates to an image processing apparatus comprising:
receiving means for receiving input image data,
an image conversion unit for converting input image data into output image data.

The invention further relates to a display device comprising an image processing apparatus comprising:
receiving means for receiving input image data,
an image conversion unit for converting input image data into output image data.

BACKGROUND OF THE INVENTION

In many display applications the visibility of details is of great importance, either since the fine details are of importance, such as in medical image processing, or simply to improve the visual appeal of the image. Sharpening of the image and local contrast enhancement methods are used to enhance the local contrast. Such a method is for instance known from "Locally adaptive image contrast enhancement without noise and ringing artifacts" by Sacha D Cvetkovic et al, Proc. of ICIP 2007, vol. p. 557-560, September 2007, San Antonio, Tex. In this method an algorithm is used that tries to equalize amplitudes of all output frequencies by assigning higher gains to frequencies with lower energy (amplitude) and vice versa. The algorithm is designed for to enhance images or video for surveillance applications to assist in the inspection of the images.

Local contrast enhancement methods suffer from annoying side effects such as halo and ringing. The known method aims to reduce these effects. The known method is however complicated and may lead to unpleasing effects providing an unnatural outlook.

It is an object of the invention to provide a method, conversion unit and image processing apparatus with an aim of increasing the quality of reproduction by relatively simple means and providing a more pleasant and natural appearance of images.

SUMMARY OF THE INVENTION

To this end, the method in accordance with the invention is characterized in that the input image data is locally filtered by a enhancement filter with a spatial frequency response to provide a filtered signal, said filtered signal is multiplied with a gain to provided a gain multiplied filtered signal, a local average luminance value is established, wherein a spatial frequency for which the spatial filter has maximum response and the gain are determined as a function of the local average luminance value, wherein the spatial filter frequency and the gain increase for increasing local luminance value and wherein the gain multiplied filtered signal is added to the input image signal to provide the output image data.

The invention is based on the insight that the human eye and brain function such that the contrast efficiency for various spatial frequencies varies as a function of luminance.

The frequency for which the filter has the maximum response, is not the only frequency for which the filter has a response, it is the frequency which characterizes the filter response most. For a band pass filter it is the center frequency of a band pass filter.

The human eye is more sensitive to high spatial frequencies in bright conditions and more to lower spatial frequencies in dimmer conditions. At display conditions this might not be strong effect. However, for most images the luminance range for the original images was much larger and the effect was there.

This natural effect can be regained by enhancing high spatial frequencies in bright areas and, in addition, boosting coarser frequencies at in dimmer areas, without enhancing the high spatial frequencies in the dimmer areas. This has been shown to lead to an increased realism of the image.

It is remarked that peaking only in bright areas, without boosting the coarser frequencies in dimmer areas does not have the same realism increasing effect. By applying a filter wherein the spatial filter frequency, i.e. the frequency at which the strongest enhancement effect is obtained, is a function of the local average luminance value and wherein the filter frequency increases as the average luminance value increases and the gain increases as the average luminance value increases, an effect is obtainable wherein in bright areas, i.e. areas of high local average luminance, high spatial frequencies are enhanced without or at least to a smaller extent enhancing lower frequencies, and thus small details are better visible. In dimmer areas lower spatial frequencies (and thus longer spatial wavelength details) are enhanced, without or at least to a smaller extent enhancing the high spatial frequencies. This dependence in frequency and gain of the sharpening effects corresponds to the contrast sensitivity of the human eye and results in a heightened realism for the displayed image. And, hence, it increases the apparent global contrast and increases naturalness.

In embodiments the filter frequency and gain are directly determined by the local average luminance value and the filter is applied to the input image data to provide filtered image data, wherein the filtered image data is added to input image data to provide output image data. Locally means at or associated with a position (x) on the image. At each pixel or area (thus locally) a tunable filter is applied wherein the frequency behavior and gain applied to the filtered signal depends on (i.e. is tuned by) the local average luminance value, in the manner as explained above.

In preferred embodiments a set of filters, responding to a range of spatial frequencies, is applied to the input image data to provide for a set of enhancement signals in which for each enhancement signal a band of spatial frequencies is selected, the bands of spatial frequencies differing and ranging from high to low, the enhancement signals are multiplied with a gain factor to provided a set of gain multiplied enhancement signals whereafter for a pixel or part of the image a mix is made of the set of gain multiplied enhancement signals to provide the gain multiplied filtered signal, wherein the mixing factors attributed to elements of the set of gain amplified enhancement signals are a function of the local average luminance value, wherein with increasing luminance the mixing factors change to increase the contribution of higher frequencies to the mix.

The advantage of this embodiment is that a simple mix is made of a number of filtered whole images, each filtered with predetermined static filter, to provide for the locally filtered image. This is a fast method that can also be easily adapted.

Preferably the set of spatial frequency (band) filters comprises three or two filters. It has been shown that using three filters (a low, medium and high spatial frequency enhancement filters) or even only two filters (a high and medium or low frequency enhancement filter) provide for good results. Such embodiments are simple and fast which provides for advantages especially in real-time applications where the processing power is limited.

These and further aspects of the invention will be explained in greater detail by way of example and with reference to the accompanying drawings, in which

BRIEF DESCRIPTION OF THE DRAWINGS

Generally, identical components are denoted by the same reference numerals in the Figures.

DETAILED DESCRIPTION OF PREFERRED EMBODIMENTS

It is remarked that below examples are shown.

Figure 1:
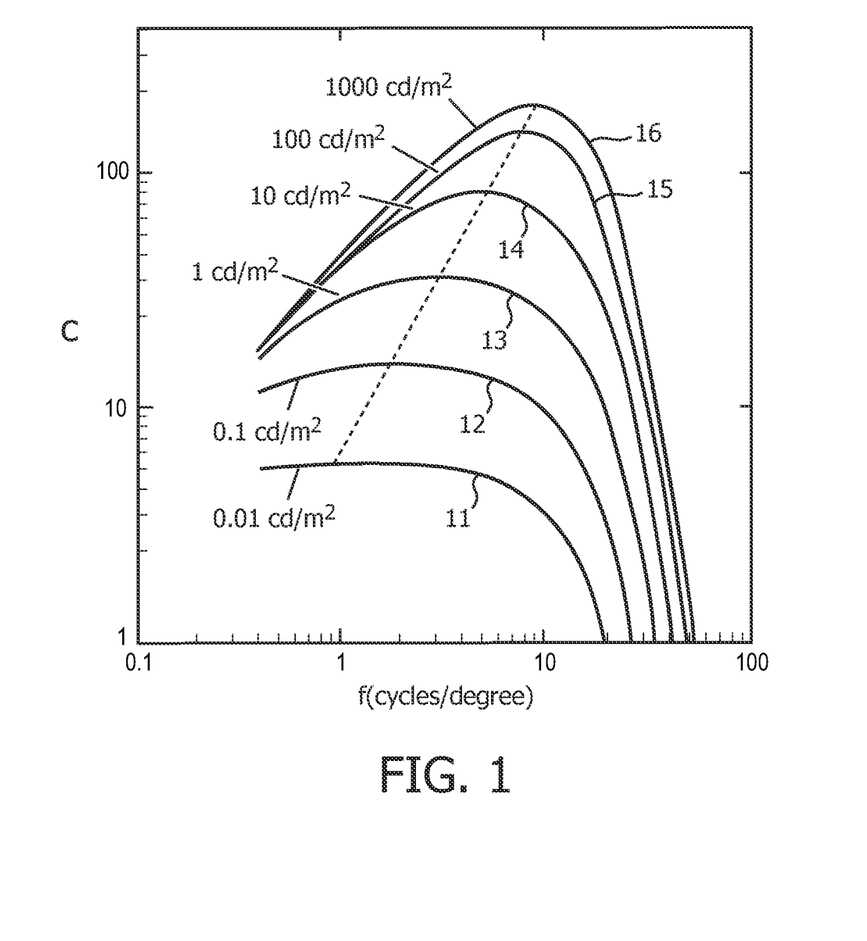
FIG. 1 illustrates the insight that lies at the basis of the invention.

FIG. 1 illustrates in the form of a graph the contrast sensitivity C on the vertical axis in arbitrary units of the human vision as for a range of luminance values as a function of spatial frequency on the horizontal axis in cycles per degree. The luminance values are for the respective curves the following: curve 11: 0.01 cd/m$^2$, curve 12: 0.1 cd/m$^2$, curve 13 1 cd/m$^2$, curve 14, 10 cd/m$^2$, curve 15 100 cd/m$^2$, curve 16, 1000 cd/m$^2$. We see that the contrast sensitivity C peaks at a specific spatial frequency for various luminances. The peak spatial frequency, in FIG. 1 illustrated by the dotted line, shifts as a function of luminance, where it shifts to higher spatial frequencies as the light intensity increases and to lower frequencies at dimmer illumination. Also the effect becomes stronger at higher luminance. At first sight this does not seem to be of much relevance to display devices. The luminance dependency is present but the dependence stretches over six orders of magnitude and thus at display luminance (which normally stretches over only three orders of magnitudes) this effect seems small at best. However, displayed images are taken from real scenes, and in the real scenes the effect was there. Therefore simulating the effect in the display by peaking in bright areas and boosting longer spatial wavelength at dimmer areas increases the sense or realism the viewer experiences when viewing the image.

Figure 2:
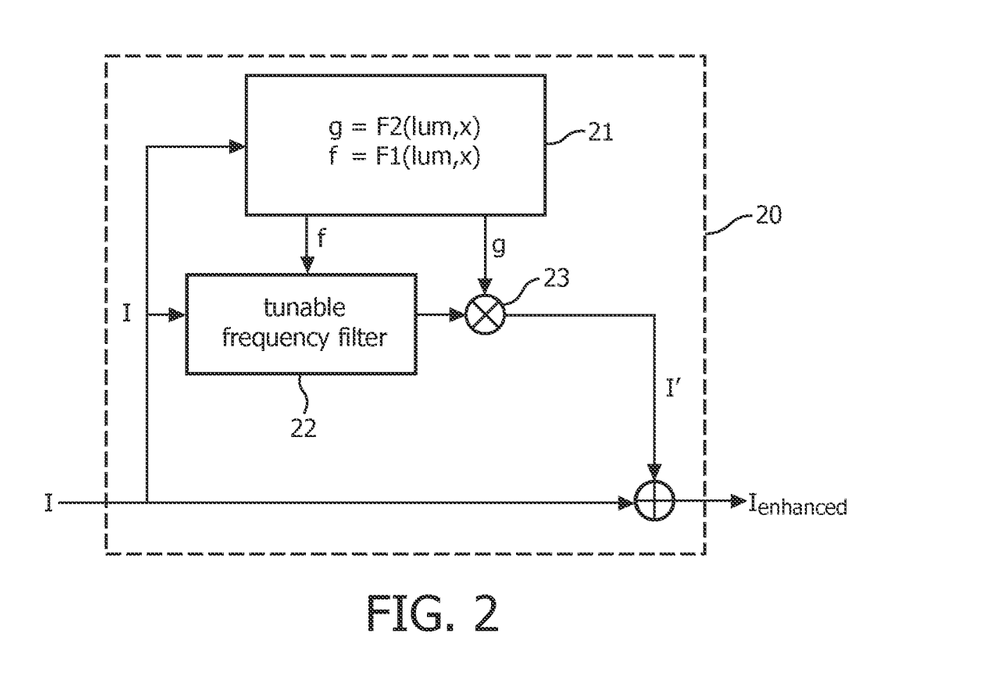
FIG. 2 illustrates in a general form the invention.

FIG. 2 illustrates the invention.

Input image data I is filtered in an image conversion unit 20 by a tunable enhancement filter 22. The tunable enhancement filter is tuned by setting a characteristic filter frequency f. This characteristic frequency f is dependent on a local average luminance lum. The characteristic frequency f, e.g. the spatial frequency at which the sharpest enhancement effect occurs, changes as a function of the local average luminance where it increases as the local average luminance increases. Thus, at high local luminance, i.e. bright areas, small details (high spatial frequencies) are enhanced and lower frequencies are not enhance or at least to much lesser extent, at lower local average luminance, i.e. at dimmer areas, lower frequencies, i.e. longer spatial wavelengths, are boosted but high spatial frequency enhancement occurs or at least to a much lesser extent.

The characteristic filter frequency f is a function at position x of the local average luminance at x; f=F1(lum, x). The gain g is also a function of the local average luminance at x and increases as the local average luminance increases; g=F2 (lum,x). These values for the local average luminance are calculated from the input image data in unit 21. This unit also provides for the characteristic frequency f for the tunable filter 22 and the gain g for the multiplicator 23. The gain multiplied filtered signal I' is added to the input data to provided an enhanced output data signal I$_{enhanced}$. This output data is used to create for instance an image on a display screen.

In short, FIG. 2 illustrates that an input image signal (I) is locally (at or around position x) filtered by an enhancement filter (22) with a spatial filter frequency (f) to provide a filtered signal, said filtered signal is multiplied with a gain (g) to provided a gain multiplied filtered signal, a local average luminance value (lum) is established (in unit 21), wherein the spatial filter frequency (f) and the gain (g) are determined as a function of the local average luminance value (f=F1(lum,x), g=F2(lum,x)). The gain multiplied signal is added to the input image signal to provide the output image signal (I$_{enhanced}$). In this example the local average luminance value is established in unit 21, it could also be established in a separate unit.

Figure 3:
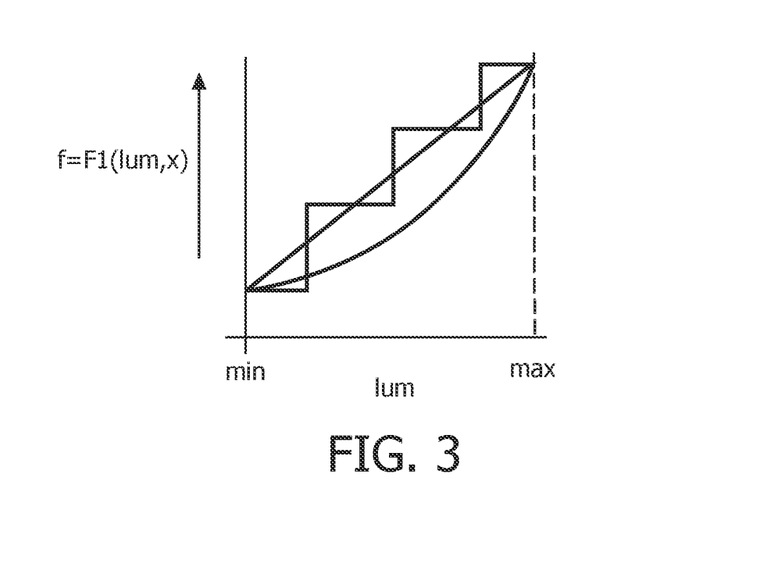
FIG. 3 illustrates the frequency of the tunable filter as a function of the local average luminance.
Figure 4:
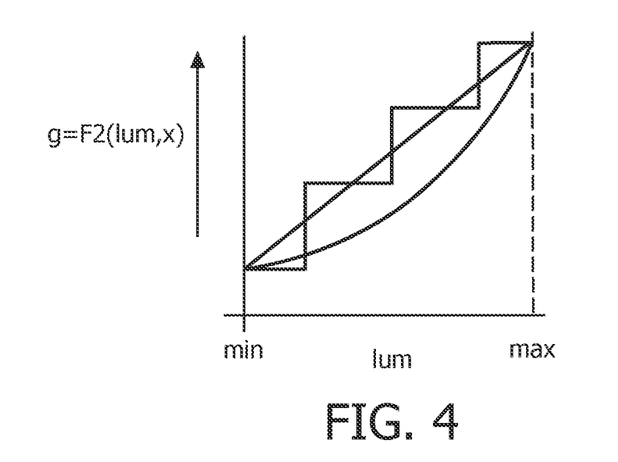
FIG. 4 illustrates the gain of the tunable filter as a function of the local average luminance.

The characteristic spatial filter frequency f and the gain g increase for increasing local luminance value. This is schematically illustrated in FIGS. 3 and 4 by means of example by a number of functional forms for F1 and F2 in which the frequency (f) and gain (g) increase as a function of the local average luminance lum. FIGS. 3 and 4 schematically show f and g on the vertical axis as function of the luminance lum on the horizontal axis. The minimum and maximum values of the luminance are given by min and max, where the maximum value is also indicated by the dotted line. The functions F1 as well as F2 can be linear or curved (such as an exponential curve) or a step-function. A step-function would for instance occur when a lock-up table is used wherein to specific ranges of luminance values specific values for the frequency or the gain are attributed. The peak frequency as well as the gain increases as function of the luminance.

Such an algorithm has several additional advantages next to the increased realism:
   Higher sensitivity for high frequencies in bright areas. Fine details become visible in bright areas.
   Less/No enhancement of noise in dark areas. Often this is true due to sensor noise. Boosting high-frequencies in dark areas would amplify noise, while in bright areas this is not the case. In darker areas lower frequencies are boosted which does not amplify noise.
   Peaking in dark areas highlights detail and reduces global image contrast. In the algorithm of FIG. 2 this effect is prevented. Peaking in dark areas will enhance the relatively light detail more than dark detail and increase the average light level in dark areas and in effect reduce the image contrast.
   Amplifying lower frequencies in bright areas creates halos, in dark areas this is much less the case. Amplifying lower frequencies in bright areas such as skies creates halos around clouds which are unnatural, in dark areas, however, halos are much more acceptable as they often look like shadows.

There are several ways for calculating a local average luminance values. One way is for instance to calculate the average luminance value using the formula below, wherein $\lambda_n(x)$ stands for the local average luminance (in FIGS. 3 and 4 denoted by lum) taken as the average value of the luminance in an n×n square of pixels around a pixel at position x. $l_{max}$ is the high end of the dynamic range, i.e. the highest possible value:

$$\lambda_n(x) = \frac{\frac{1}{n^2} \cdot \sum_{d \in N_n} I(x+d)}{l_{max}}, N_n = \left[-\left\lfloor\frac{n}{2}\right\rfloor, \left\lfloor\frac{n}{2}\right\rfloor\right] \times \left[-\left\lfloor\frac{n}{2}\right\rfloor, \left\lfloor\frac{n}{2}\right\rfloor\right]$$

Dividing by $l_{max}$ normalizes the average luminance value to a value between 0 (completely dark area around the pixel) and 1 (most bright area around the pixel).

An average luminance value could also be obtained by calculating a median value (i.e. the value for which 50% of the surrounding pixels is brighter and 50% is dimmer). Thus, within the concept of the invention an average luminance value can be a mean luminance value.

Also weighted averages can be used to calculate the average luminance value, wherein a number of shells of pixels surrounding the pixel at position x is taken into consideration and the weight attributed to such shells decreases as the shells are further from the pixel at position x. In calculating an average (including a mean value) the highest or lowest value can be removed before calculating the average to reduce disturbing effects of fluke peak or dips in light intensity.

Luminance as well as luma value can be used for calculating the average luminance value. The two values (luminance and luma) are strongly interrelated. In short, the calculation of the average luminance value, within the concept of the invention, can be based on any data that is used for, expresses or relates to the local brightness at the image. An average can be taken by any algorithm or formula used to calculate a statistical value relevant to the average brightness, be it the median value or the average value and be it taking into account (as is often done in taking average values) weight factors or removing possible stray values prior to the calculation. In the above example an area of n×n pixels is used. N can be for instance 3, 5 or 7. It is also possible to use an n×m area around the pixel.

The general set-up of FIG. 2 can be implemented by applying directly at each pixel or area a tunable filter wherein the frequency behavior and gain of the filter depends on the local average luminance value lum.

Figure 5:
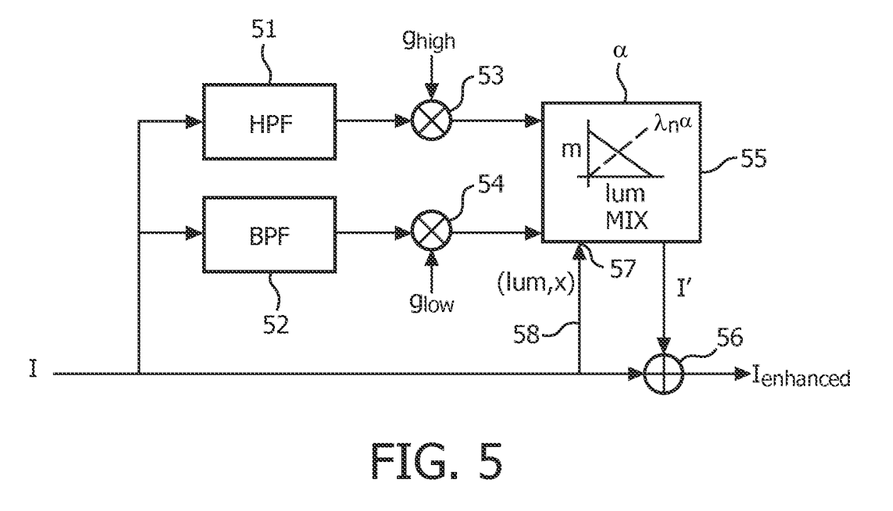
FIG. 5 illustrates an embodiment of the method and device of the invention.

However, the inventor has realized that a faster and simpler scheme, as illustrated in FIG. 5 accomplishes the same method steps in approximation.

In this exemplary embodiment a number, in this example two, copies of the input image data are used. In one copy the high-frequencies are selected by a high pass filter (HPF) 51, and in the other copy the mid-frequencies are selected by use of a medium pass filter (BPF) 52, both filters being band-pass filters. The copies are multiplied by gains $g_{high}$ and $g_{low}$ in multiplicators 53 and 54 respectively. Then, depending on the local average luminance value the two selected copies are mixed in mixer (MIX) 55 and added to the original image I in adder 56 to obtain the final enhanced image $I_{enhanced}$. The mixer 55 has an input for local luminance values, in FIG. 5 schematically indicated by line 58. The mixing can be linearly dependent on the local luminance value or for instance an exponential function can be used.

In formula the algorithm, as applied to image I, can be described as follows:

$$I_{enhanced}(x) = I(x) + \lambda_n(x)^\alpha \cdot g_{high} \cdot [HPF*I](x) + (1-\lambda_n(x)^\alpha) \cdot g_{low} \cdot [BPF*I](x)$$

The frequency dependent filters HPF and BPF are implemented for instance using differences of box-filters. HPF*I is the convolution of the filter and I. The HPF is, by means of an example, determined by substracting a box filtered image filtered with a box size of 5×5 pixels from the original image. For the BPF, for example, a box filtered image filtered with a box size of 9×9 pixels is created and a box filtered image filtered with a box size equal to the image width w divided by 30, i.e. w/30×w/30, is substracted from it. $\lambda_n(x)$ is the local luminance level at x of a small neighborhood of size $n^2$, typically 5×5 pixels, normalized between 0 and 1. This local luminance level is used to mix the two enhancement signals. An exponential can be applied to the local luminance to shift the balance, and for example apply peaking only to the very bright areas (by setting $\alpha>1$). In an example, a was set to 1. Finally there are two constant gains, one for the high-frequencies and one for the low-frequencies, to fine tune the algorithm. In an example, $g_{high}$ is set to 3 and $g_{low}$ to 0.5. The mixing factors are in this example $\lambda_n(x)^\alpha$ respectively $(1-\lambda_n(x)^\alpha)$. In FIG. 5 the mixing is graphically illustrated by means of a graph of the mixing factors m as a function of the local average luminance value lum. The unbroken line gives the mixing factor of the low frequency contribution (i.e $(1-\lambda_n(x)^\alpha)$), the broken line for the high frequency contribution (i.e. $\lambda_n(x)^\alpha$). In this figure the value of a may be an input for the mixer (MIX) 55.

As the value of the local luminance increases more of the high frequency enhancement signal $\{g_{high} \cdot [HPF*I](x)\}$ is mixed in and the gain increases.

The advantage of this embodiment is that in the mixer 55 a simple mix is made of a number of filtered whole images to provide for the locally filtered image. This is a fast method that can also be easily adapted. The shift to higher frequency and higher gain as the luminance increases is accomplished by changing the mix such that the higher frequency enhancement signal is given a higher weight factor as the local average luminance value increases.

For each image only two static predetermined filter operations have to be performed on the image as a whole, the rest is mix of the two filtered images which can be done fast and easily for each pixel.

Figure 6:
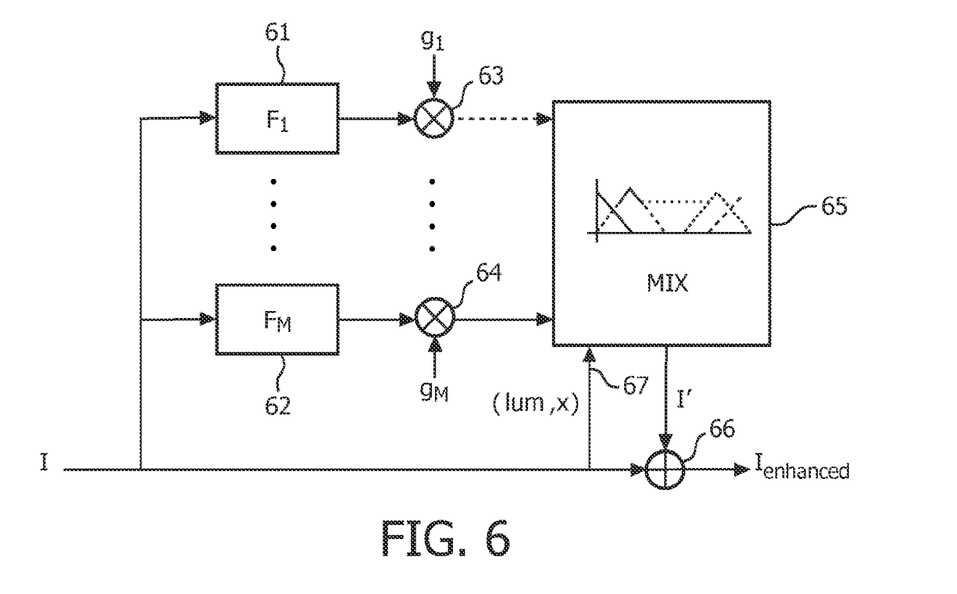
FIGS. 6, 7 and 8 illustrate further embodiments of the invention.

This scheme can be further expanded by using a set of filters. FIG. 6 illustrates such a scheme:

A set of filters 61 ($F_1$), to 62 ($F_m$), is used where each filter has a peak frequency, for ease of understanding it is assumed that the peak frequencies of $F_M$ to $F_1$ form a set of peak frequencies $f_m$ to $f_m$, wherein it holds $f_M < f_{M-1} < \ldots < f_1$. Thus $F_1$ is the filter with the highest characteristic or peak frequency, for enhancing the finest details, and $F_M$ responds to the lowest range of spatial frequencies for enhancing coarser features.

Each filtered copy of the input image I is multiplied by a gain $g_M$ to $g_1$ in multiplicators (63, 64), and the gain multiplied filtered signals are mixed in the mixer 65 (MIX). The mixing is schematically indicated by the various lines in the box 65. At the lowest luminance value only filter $F_M$ plays a role, at somewhat higher luminances also $F_{M-1}$ is mixed in, and at the highest end of the luminance scale only $F_1$ is mixed in. In the mixer 65 (MIX) an example of the use of mixing factors is graphically illustrated, the unbroken line near the beginning of the graph shows the mixing factor of the lowest frequency contribution $F_M$, at the end of the luminance scale the mixing factor of the highest frequency contribution $F_1$ is illustrated by the broken line, the dotted line immediately preceding this broken line illustrates the mixing factor for the second highest frequency contribution etc.

For an example of three filters table 1 provides an example.

TABLE 1 exemplary mixing scheme for three enhancement signals:

| Luminance value | Low frequency enhancement signal F3, gain g3 = 0.5 mixing factor | medium frequency enhancement signal F2, gain g2 = 1.5 mixing factor | High frequency enhancement signal F1, gain g = 3.0 mixing factor |
|---|---|---|---|
| 0–0.075 | 1 | 0 | 0 |
| 0.075–0.15 | 0.9 | 0.1 | 0 |
| 0.15–0.225 | 0.7 | 0.3 | 0 |
| 0.225–0.3 | 0.5 | 0.5 | 0 |
| 0.3–0.375 | 0.3 | 0.7 | 0 |
| 0.375–0.45 | 0.1 | 0.9 | 0 |
| 0.45–0.525 | 0 | 1 | 0 |
| 0.525–0.60 | 0 | 0.9 | 0.1 |
| 0.60–0.68 | 0 | 0.7 | 0.3 |
| 0.68–0.76 | 0 | 0.5 | 0.5 |
| 0.76–0.84 | 0 | 0.3 | 0.7 |
| 0.84–0.92 | 0 | 0.1 | 0.9 |
| 0.92–1 | 0 | 0 | 1 |

At the lowest and highest end of the luminance scale the low frequency enhancement signal respectively high frequency enhancement signal is used. As the average luminance value lum increases from the lower (0) to the higher (1) end of the luminance scale the mix of the three enhancement signals $F_1$, $F_2$, $F_3$ shifts to mixing in higher frequency enhancement signals. The characteristic frequency of the filter in total, formed by means of mixing the three enhancement signals with the mixing factors thus shifts towards higher frequency and higher gain as the luminance value increases.

The methods and system of the invention may be used in various manners for various purposes such as for instance to create enhancement algorithms and other video processing algorithms.

The invention is also embodied in a computer program comprising program code means for performing a method according to the present invention, when executed on a computer.

The invention can be used in or for conversion units of image signals and devices in which a conversion of image signals is used, such as display devices. In the claims, any reference signs placed between parentheses shall not be construed as limiting the claim.

The word "comprising" does not exclude the presence of other elements or steps than those listed in a claim. The invention may be implemented by any combination of features of various different preferred embodiments as described above. The word "unit" is meant to indicate any entity, whether in hard-ware or in soft-ware or both and whether concentrated in one physical entity or divided in subunits that is arranged to perform the indicated function.

The invention is not limited to the above given examples, but can be executed in various ways.

One possible way is to mix in salience in the equation.

Figure 7:
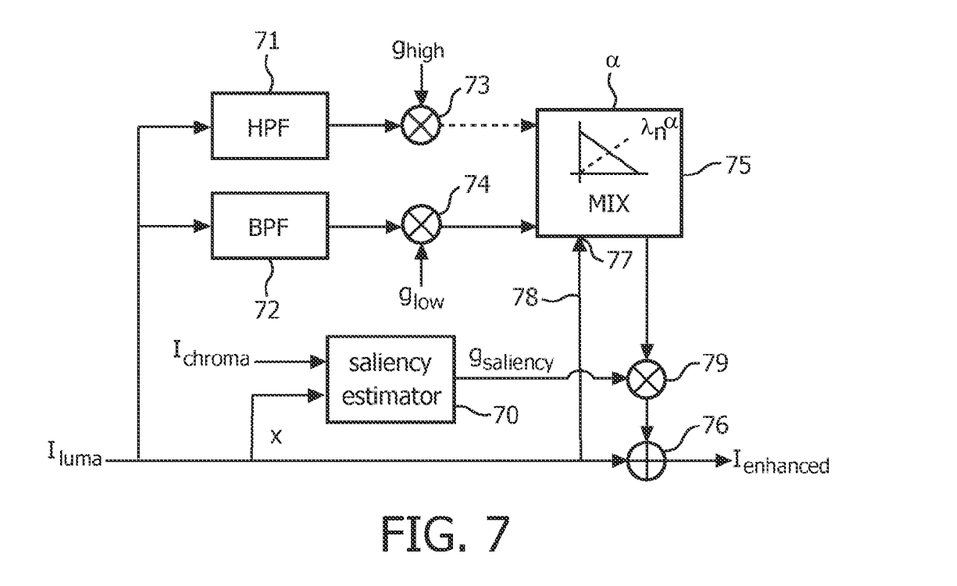

FIG. 7 illustrates such an embodiment. This is an example in which, after the mix, the mix of enhancement signals undergo an additional treatment, in this example a gain multiplication, before being added in adder 76 to the input signal I to provide the enhanced signal $I_{enhanced}$.

For the most part FIG. 7 follows the scheme of FIG. 5 apart from renumbering the various parts:

In the scheme of FIG. 7 a number, in this example two, copies of the input image data are used. In one copy the high-frequencies are selected by a high pass filter (HPF) 71, and in the other copy the mid-frequencies are selected by use of a medium pass filter (BPF) 72, both filters being band-pass filters. The copies are multiplied by gains $g_{high}$ and $g_{low}$ in multiplicators 73 and 74 respectively. Then, as a function of the local average luminance value the two selected copies are mixed in mixer (MIX) 75 and added to the original image I in adder 76 to obtain the final enhanced image $I_{enhanced}$. The mixer 75 has an input for local luminance values, in FIG. 7 schematically indicated by line 78. The mixing can be linearly dependent on the local luminance value or for instance an exponential function can be used.

The extra step is that the after the mix the so made mixed signal is, at multiplicator 79, multiplied with a gain $g_{salience}$. This gain is calculated in part 70. Saliency is also called visual attention that is given to a part of the screen. The saliency estimator estimates the visual attention that a viewer gives to a certain part of the image. One component that could be important is the color; Thus, one input for the saliency estimator 70 can be the chroma value. This is schematically indicated in FIG. 7 where the chroma value. $I_{chroma}$ forms an input for the saliency estimator 70. Another input can be the position x on the screen since the human vision tends to be more attentive to certain parts of the screen, such as the centre part, than other parts, such as the peripheral parts. Dependent thereon the output of mixer 75 can be increased (gain higher than 1) to make the enhancement stronger or decreased (gain lower than 1) to make the enhancement less pronounced by means of the salience gain $g_{salience}$ at multiplicator 79.

Figure 8:
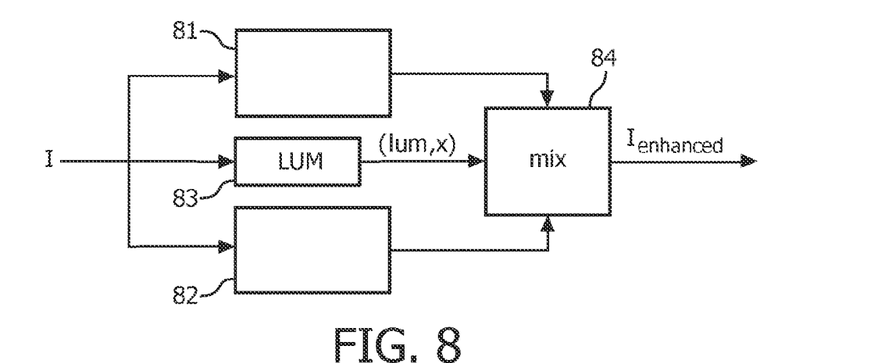

Another example is provided in FIG. 8. The algorithm described above for FIG. 5 is written as follows:

$$I_{enhanced}(x)=I(x)+\lambda_n(x)^\alpha \cdot G_{high} \cdot [HPF*I](x)+(1-\lambda_n(x)^\alpha) g_{low} \cdot [BPF*I](x)$$

This can be rewritten as:

$$I_{enhanced}(x)=(\lambda_n(x)^\alpha+1-\lambda_n(x)^\alpha) \cdot I(x)+\lambda_n(x)^\alpha \cdot g_{high} \cdot [HPF*I](x)+(1-\lambda_n(x)^\alpha) \cdot g_{low} \cdot [BPF*I](x)$$

This formula is term can be rewritten as:

$$I_{enhanced}(x)=\lambda_n(x)^\alpha \cdot (g_{high} \cdot [HPF*I]+I)(x)+(1-\lambda_n(x)^\alpha) \cdot (g_{low} \cdot [BPF*I]+I)(x)$$

The formula now has two components:
an image I(x) plus enhanced high spatial frequencies ($g_{high} \cdot [HPF*I]$)
an image I(x) plus enhanced mid spatial frequencies ($g_{low} \cdot [HPF*I]$)
These two components are mixed with the mixing factors $\lambda_n(x)^\alpha$ respectively $(1-\lambda_n(x)^\alpha)$ FIG. 8 illustrates such an example. The input signal I undergoes an enhancement of high frequency components in enhancer 81, thus providing a signal I+ boosted high spatial frequencies, and an enhancement of middle frequency components in enhancer 82.

The local luminance values of input signal I are calculated in calculator 83. The two signals, one with boosted high frequency and one with boosted middle frequency are mixed in mixer (MIX) 84 wherein the mixing factor are a function of the local average luminance value as explained above. The mix of the two boosted signals provides the enhanced signal $I_{enhanced}$. This embodiment differs from the embodied of FIG. 5 in that in the mixer both the mixing and the addition of mix the enhancement signals to the input signal is performed in one step.

However, as the above rewriting of the formula shows, these two embodiments, though differing in practical set-up are in essence the same. In FIG. 8 for each image only two static predetermined filter operations have to be performed on the image as a whole, the rest is mix of the two filtered images which can be done fast and easily for each pixel.

The scheme of FIG. 8 can also be extended, in the same manner as FIG. 6 forms an extension of FIG. 5, by using a set of boosting algorithms to boost high, middle and low frequencies or even more frequency bands, and then mix the outcoming signals.

Figure 9:
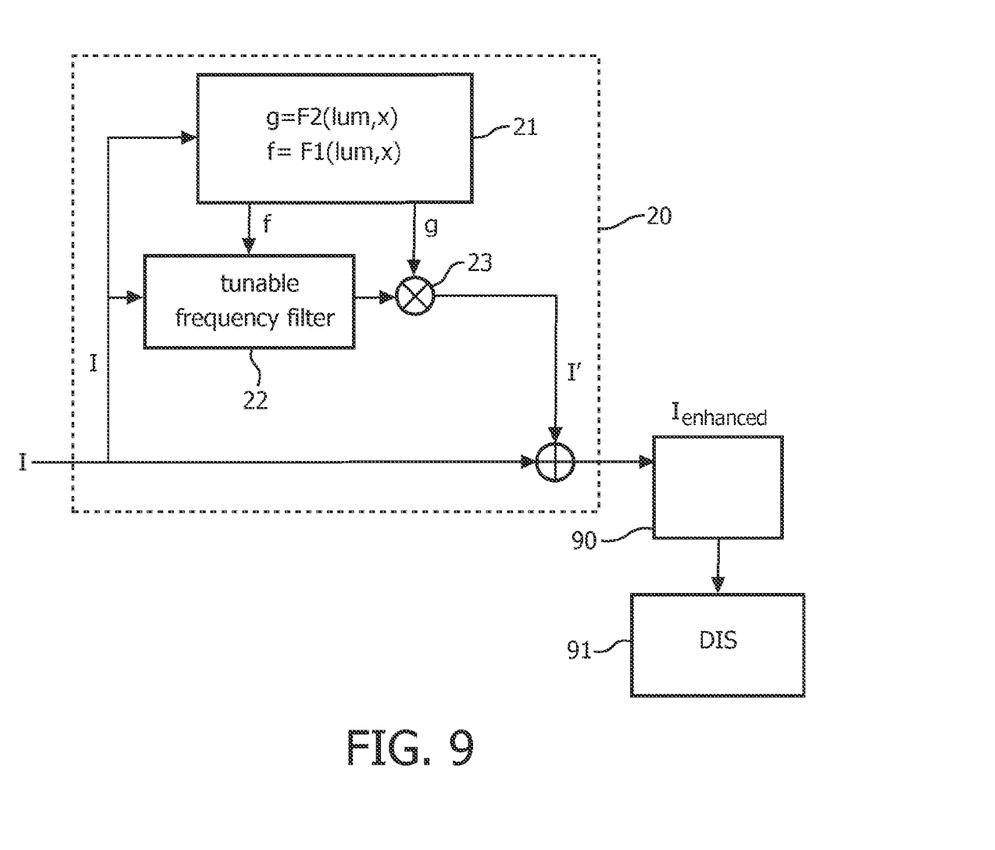
FIG. 9 illustrates a display device of the invention

FIG. 9 illustrates a display device in accordance with the invention. The enhanced output data is sent to a display screen (DIS) 91, the data can if needed first be postprocessed by a post-processing unit 90.

In short the invention can be described as follows:

In a method and device for improving image rendition by contrast and/or sharpness enhancement the sharpness enhancement is made dependent on the local average luminance value such that at high luminance high spatial frequencies are enhanced, while for lower luminance lower spatial frequencies are enhanced. In an embodiment a mix is made of spatially enhanced image signals, wherein for various signal differing spatial frequencies are boosted from high to low. The mixing factors for mixing of the boosted signals are dependent on a local average luminance value such that the distribution over frequency bands shifts to higher frequencies and sharper enhancement as the luminance value increases.

FIG. 2 illustrates the use of a local enhancement filter wherein the peak frequency and the gain is dependent on the local luminance value such that, with increasing local luminance the band of frequencies that are mainly enhanced shift to higher frequencies and the overall enhancement effect increases with increasing luminance. FIG. 5 illustrates that the same effect can be obtained by enhancing the image as a whole (or if the method of the invention is done only at a certain part of the image, said part of the image) to provide enhancements at several (at least two) frequency bands. These enhancements signals are then mixed, i.e. added to each other at the mixer wherein the mix depends on the local average luminance value and more and more of the higher frequency enhancement is mixed in as the average luminance value increases. Effectively, the scheme of FIG. 5 does the same as the scheme of FIG. 2, but it can be done quicker since only a limited number of static filters with static filter parameters are used. The mixing is an addition method step which can be done with great speed.

The invention claimed is:

1. Method for converting input image data (I) into output image data ($I_{enhanced}$) wherein the input image data (I) is locally (x) filtered by an enhancement filter (22) with a spatial frequency response to provide a filtered signal, said filtered signal is multiplied with a gain (g) to provided a gain multiplied filtered signal (I'), a local average luminance value (lum) is established, wherein a spatial filter frequency (f) for which the spatial filter has maximum response and the gain (g) are determined as a function of the local average luminance value, wherein the spatial filter frequency (f) and the gain (g) increase for increasing local luminance value, wherein the gain multiplied filtered signal (I') is added to the input image signal to provide the output image data, wherein a set of frequency dependent enhancement filters is applied to the input image data (I) to provide for a set of enhancement signals in which for each enhancement signal a band of spatial frequencies is enhanced, the bands of spatial frequencies differing and ranging from high to low, the enhancement signals are multiplied with a gain factor to provided a set of gain multiplied enhancement signals whereafter for a pixel or part of the image a mix (MIX) is made of the set of gain multiplied enhancement signals to provide the gain multiplied filtered signal, wherein the mixing factors (m) attributed to elements of the set of gain amplified enhancement signals are a function of the local average luminance value (lum), wherein with increasing luminance the mixing factors change to increase the contribution of higher frequencies to the mix.

2. Method as claimed in claim 1, wherein the set of frequency dependent enhancement filters comprises three or two filters.

3. Method as claimed in claim 2, wherein the set of frequency dependent enhancement filters comprises two filters (HPF, BPF).

4. A non-transitory computer-readable medium including computer program code that, when executed by a processor of a computer to convert input image data into output image data, the non-transitory computer-readable medium comprising:

a filtering module that, when executed by the processor of the computer, causes the processor to locally filter input image data using an enhancement filter, with a spatial frequency response, to provide a filtered signal;

a multiplying module that, when executed by the processor of the computer, causes the processor to multiply the filtered signal with a gain to provided a gain multiplied filtered signal;

an average luminance module that, when executed by the processor of the computer, causes the processor to establish a local average luminance value, wherein a spatial filter frequency, for which the spatial filter has a maximum response, and the gain are determined as a function of the local average luminance value, wherein the spatial filter frequency and the gain increase for increasing local luminance value, wherein the gain multiplied filtered signal is added to the input image signal to provide the output image data, wherein a set of frequency dependent enhancement filters is applied to the input image data (I) to provide for a set of enhancement signals in which for each enhancement signal a band of spatial frequencies is enhanced, the bands of spatial frequencies differing and ranging from high to low, the enhancement signals are multiplied with a gain factor to provided a set of gain multiplied enhancement signals whereafter for a pixel or part of the image a mix (MIX) is made of the set of gain multiplied enhancement signals to provide the gain multiplied filtered signal, wherein the mixing factors (m) attributed to elements of the set of gain amplified enhancement signals are a function of the local average luminance value (lum), wherein with increasing luminance the mixing factors change to increase the contribution of higher frequencies to the mix.

5. Image conversion unit (20) for converting input image data (I) into output image data, comprising an input for input image data (I) and an output for output image data is, an enhancement filter (22) for locally (x) filtering the input image data (I), said filter having a spatial frequency response to provide a filtered signal, a multiplicator (23) for multiplying said filtered signal with a gain (g) to provided a gain multiplied filtered signal, a means (21) for establishing local average luminance values, and determining a spatial frequency (f) for which the frequency filter has maximum response and the gain (g) as a function of the local average luminance value, wherein the spatial frequency (f) and the gain (g) increase for increasing local average luminance value, and a means for adding the gain multiplied filtered signal (I') to the input image signal (I) for providing the output image data, wherein the unit comprises a set of frequency dependent enhancement filters for the input image data (I) to provide for a set of enhancement signals in which for each enhancement signals a band of spatial frequencies is enhanced, the bands of spatial frequencies differing and ranging from high to low, multiplicators for multiplying the enhancement signals with a gain factor (gM, g1) to provided a set of gain multiplied enhancement signals, the unit further comprising a means to, for a pixel or part of the image, make a mix (MIX) of the set of gain multiplied enhancement signals to provide the gain multiplied filtered signal, wherein the mixing factors attributed to elements of the set of gain amplified enhancement signals are a function of the local average luminance value (lum), wherein with increasing luminance the mixing factors change to increase the contribution of higher frequencies to the mix.

6. Image conversion unit as claimed in claim 5, wherein the image conversion unit comprises three or two filters.

7. Image conversion unit as claimed in claim 6, wherein the image conversion unit comprises two filters.

8. Image conversion unit as claimed in claim 7, wherein the two filters are formed by a high pass filter and a medium pass filter.

9. Image processing apparatus comprising receiving means for receiving input image data and an image conversion unit for converting the input image data into output image data as claimed in claim 5.

10. Display device comprising an image processing apparatus comprising: receiving means for receiving input image data, an image conversion unit for converting input image data into output image data, as claimed in claim 5 and a display screen (DIS).

\* \* \* \* \*